| United States Patent [19] | [11] 3,862,087 |
| Heller et al. | [45] Jan. 21, 1975 |

[54] LIGHT STABLE LINEAR POLYCARBONAMIDE AND POLYESTER MATERIALS

[75] Inventors: Hansjorg Heller, Riehen; Jean Rody, Basel; Ernst Keller, Baselland, all of Switzerland

[73] Assignee: Ciba-Geigy AG, Basel, Switzerland

[22] Filed: Aug. 10, 1973

[21] Appl. No.: 387,310

Related U.S. Application Data

[60] Division of Ser. No. 271,044, July 12, 1972, abandoned, which is a division of Ser. No. 884,364, Dec. 11, 1969, Pat. No. 3,766,205, which is a continuation of Ser. No. 544,834, April 25, 1966, abandoned, which is a continuation-in-part of Ser. No. 202,664, June 15, 1962, abandoned, and Ser. No. 202,665, June 15, 1962, abandoned, and Ser. No. 202,666, June 15, 1962, abandoned, and Ser. No. 202,667, June 15, 1962, abandoned, and Ser. No. 202,668, June 15, 1962, abandoned, and Ser. No. 328,480, Dec. 6, 1963, abandoned, and Ser. No. 535,740, March 21, 1966, abandoned.

[30] Foreign Application Priority Data

June 16, 1961 Switzerland.......................... 7103/61

[52] U.S. Cl. ...... 260/47 CZ, 117/161 K, 117/161 P, 260/32.4, 260/32.6 N, 260/33.8 R, 260/45.8 N, 260/45.9 R, 260/470 P, 260/49, 260/63 R, 260/65, 260/78 R, 260/78 A, 260/78.4 N, 260/857 R

[51] Int. Cl.............................................. C08g 20/20

[58] Field of Search.......... 260/47 CZ, 78 R, 47 CP, 260/45.8 N, 45.9 R, 49, 78.4 N, 63 R, 65, 857, 78 A

[56] References Cited
UNITED STATES PATENTS

| 3,213,058 | 10/1965 | Boyle et al............................ 260/47 |
| 3,282,886 | 11/1966 | Gadecki............................ 260/45.7 |

*Primary Examiner*—Lester L. Lee
*Attorney, Agent, or Firm*—Wenderoth, Lind & Ponack

[57] ABSTRACT

UV absorbant high molecular polyamides having improved light stability are obtained when a 2-(2'-hydroxyphenyl)-benzotriazole compound which, in at least one side chain contains at least one condensable carboxyl group or at least one condensable aliphatically or cycloaliphatically bound amino group or condensable groups reacting in the same way which are derived from these carboxyl or amino groups is reacted at temperatures of 150°–350°C with polycondensable amide forming monomers or with polycondensates thereof to form polycarbonamides.

UV absorbant high molecular polyesters having improved light stability are obtained if certain 2-(2'-hydroxyphenyl)-benzotriazole compounds which, in at least one side chain of each of their molecules contain from one to two condensable aliphatically or cycloaliphatically found hydroxyl groups or condensable groups reacting in the same way which are derived from these hydroxyl groups are reacted at temperatures of 150°–350°C with polycondensable monomers or with polycondensates thereof to form the said polyesters.

9 Claims, No Drawings

LIGHT STABLE LINEAR POLYCARBONAMIDE AND POLYESTER MATERIALS

This is a divisional application of Ser. No. 271,044, filed July 12, 1972, (now abandoned) which application in turn is a division of application Ser. No. 884,364, filed Dec. 11, 1969, now U.S. Pat. No. 3,766,205, which application is a continuation of application Ser. No. 544,834 filed Apr. 25, 1966 (now abandoned), which application is in turn a continuation-in-part of applications Ser. Nos. 202,664; 202,665; 202,666; 202,667 and 202,668, all filed June 15, 1962 (all now abandoned), Ser. No. 328,480, filed Dec. 6, 1963 (now abandoned) and Ser. No. 535,740, filed Mar. 21, 1966 (now abandoned).

In a first aspect the present invention concerns light-stable linear polycarbonamides.

It has been found that UV absorbant high molecular polyamides having improved light stability are obtained if a 2-(2'-hydroxyphenyl)-benzotriazole compound which, in at least one side chain contains at least one condensable carboxyl group or at least one condensable aliphatically or cycloaliphatically bound amino group or condensable groups reacting in the same way which are derived from these carboxyl or amino groups, is reacted at temperatures of 150°–350°C with polycondensable amide forming monomers or with polycondensates thereof to form polycarbonamides.

If the carboxylic acid derivatives taking part in the polymerization are used in the form of their carboxylic acid halides, then the polycondensation can be performed at 0°–200°C.

Groups reacting in the same way as a condensable carboxyl group are, for example, carboxylic acid ester, carboxylic acid halide, carboxylic acid anhydride, and nitrile groups; groups reacting in the same way as a condensable amino group are for example, the acylamino groups.

The 2-(2'-hydroxyphenyl)-benzotriazole compounds used according to the invention as co-condensable monomers correspond to the general formula I

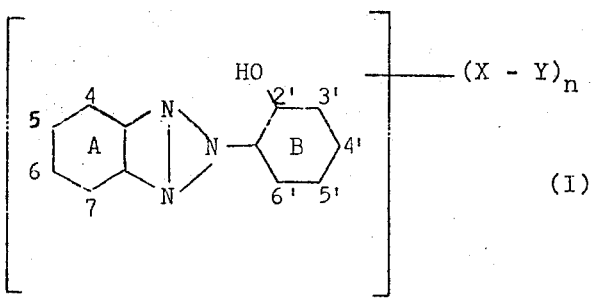

(I)

In this formula:
X represents a divalent organic bridging member of a non-color producing character,
Y represents a group which produces the carbonyl or amido portion of a carboxylic acid amide grouping in the condensation, this portion in the following being termed Y'; this amido portion is not bound to an unsaturated carbon atom,
n represents the numbers 1 or 2,
and wherein the nucleus A can contain in the 4-, 5- and 6-positions the grouping —(X—Y) and/or alkyl, alkoxy, carboxyl, carboxylic acid ester, carboxylic acid amide, sulphonic acid amide groups or halogens and also alkylsulphonyl groups and the nucleus B can contain in the 3'-, 4'- or 5'- positions the grouping —(X—Y)— and/or hydrocarbon groups, alkoxy groups or halogens, X preferably represents the grouping of the formula

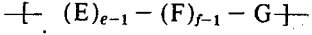

wherein
E represents an alkylene group preferably containing 1–5 C atoms such as the methylene or 2-methyl-1,3-butylene group
F represents a divalent group containing hetero atoms such as the groups —O—, —S—, —SO$_2$—,

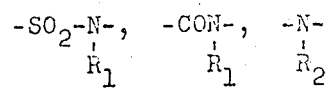

G represents an alkylene group containing preferably 1–4 C atoms such as the methylene, ethylene or 1,4-butylene group an alkylene group substituted by Y, which group preferably contains 2–3 C atoms without Y, such as the

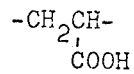

grouping provided that $n = 1$; a phenylene group; a cycloalkylene group having preferably 6–7 C atoms such as the cyclohexylene group; a cycloalkylene group substituted by Y, which group preferably contains 6–7 C atoms without Y, such as the groupings:

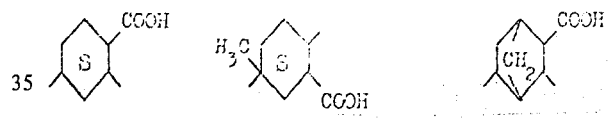

an aralkylene group preferably with 7–8 C atoms such as the α,2-benzylene group, whereby R$_1$ represents hydrogen, an alkyl group having preferably 1–8 C atoms such as the methyl, butyl or heptyl group, or a —G—Y— group such as the grouping —CH$_2$CH$_2$OH, and R$_2$ represents an acyl group preferably having 1–8 C atoms such as the formyl, acetyl, benzoyl or capryloyl group, or an acyl group substituted by Y, which group without Y contains preferably 2–6 C atoms such as the grouping —COCH$_2$CH$_2$COOH and —CO—C$_6$H$_4$—COOH, and $e$ and $f$ represent the numbers 1 or 2, with the proviso that $f$ is at least as large as $e$.

In particular, Y can be a —COZ, —COOR$_3$, —CN, —NHR$_4$,

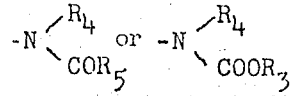

group, whereby the carboxyl group and its functional derivatives can be bound to a carbon atom of tetrahedral or trigonal structure, i.e. to a a carbon atom having the co-ordination number 4 or 3; the amino group or functional derivatives thereof however, can only be bound to a tetrahedral carbon atom, i.e. a carbon atom of the co-ordination number 4, and wherein Z represents a hydroxyl group, an acyloxy group such as, e.g. an acetoxy group, the radical benztriazole —X—COO— or the remainder of a cyclic carboxylic acid anhydride grouping which Y forms together with a part of X, or a halogen atom such as, e.g. the chlorine atom, $R_3$ represents any hydrocarbon group desired, possibly substituted by hydroxyl groups, provided that the grouping $R_3OH$ is volatile under the condensation conditions such as preferably a low alkyl group, e.g. the methyl or butyl group, or a hydroxyalkyl group, e.g. a $\beta$-hydroxyethyl group, $R_4$ represents an alkyl, cycloalkyl or aralkyl group such as, e.g. a methyl, ethyl, butyl, cyclohexyl or benzyl group, preferably however, a hydrogen atom, and $R_5$ represents hydrogen or a hydrocarbon group possibly substituted by carboxyl groups such as the methyl, 4-carboxybutyl or p-carboxyphenyl group;

$R_4$ and $R_4$ can also be bound to each other and, together with the —NCO— group they form a heterocyclic ring. In this case $R_4$ represents a carbonyl or a methylene group possibly substituted by low alkyl groups, and $R_5$ represents the remainder of a monocyclic heterocycle having 5 to 7 ring members.

A is a monocyclic o-arylene ring which, in addition to hydrogen, can contain in the 4-, 5- 6- positions also the grouping —(X—Y) and/or alkyl groups such as methyl, ethyl, n-propyl, isopropyl, n-, iso- or tert. butyl or octyl groups, alkoxy groups such as the methoxy, ethoxy or butoxy group, halogens such as fluorine, chlorine or bromine, carboxylic acid group, carboxylic acid ester groups, i.e. carboxylic acid alkyl ester groups such as carbomethoxy, carboethoxy, carbopropoxy or carbobutoxy groups, carboxylic acid or sulphonic acid amide groups possibly aliphatically, cycloaliphatically, araliphatically or aromatically substituted at the nitrogen atom such as carboxylic acid or sulphonic acid amide, methylamide, ethylamide, cyclohexylamide, benzylamide, phenylamide, dimethylamide, diethylamide, N-methyl-N-cyclohexyl amide, $\gamma$-methoxypropylamide, piperidide or morpholide groups, also alkylsulphonyl groups such as methylsulphonyl, ethylsulphonyl or butylsulphonyl groups; the grouping —(X—Y) is preferably in the 5-position.

B is an o-hydroxy-monocyclic aryl ring which, in addition to hydrogen, can be substituted in the 3'-, 4'-, 5'- positions by the grouping —(X—Y) and/or hydrocarbon radicals such as methylethyl, benzyl, cyclohexyl or phenyl groups, alkoxy groups such as methoxy, ethoxy, propoxy, isopropoxy or n-butoxy groups, or halogens such as chlorine or bromine.

Benztriazole compounds which absorb particularly at long wave lengths contain acidifying substituents in the 4 -and/or 5-position or basifying substituents in the 3'- and/or 5'-position. Benztriazole compounds having particularly high molar extinction in the region of 330–350 $\mu$ are those which contain basifying substituents in the 5- and/or 4'-position. The molar absorption in the region of 300 $\mu$ is promoted by possibly further substituted alkyl substituents. Examples of basifying substituents are alkoxy groups such as the methoxy, isopropoxy, cyclohexyloxy and benzyloxy groups; examples of acidifying substituents are alkylsulphonyl groups such as the methyl and ethyl sulphonyl group, sulphonic acid amide groups such as the sulphonic acid methyl, butyl and cyclohexyl amide group and also the carboxyl group and its esters or amides.

X in formula I, for example represents:

a. divalent hydrocarbon bridging members such as divalent alkylene groups, e.g. methylene, ethylidene, 1,2-ethylene, 1,4-butylene, 1,3- or 2,2- dimethyl-1,3-propylene groups; divalent cycloalkylene groups, e.g. 1,1-, 1,2- and 1,4- cyclohexylene groups; divalent aralkylene groups, e.g. benzylidene, $\omega$,2- or $\omega$,4- benzylene groups, or divalent arylene groups, e.g. 1,4-phenylene or 2,4-toluylene groups, b. combinations of divalent hydrocarbon bridging members give under (a) with:

$b_1$. divalent hetero atoms such as oxygen, sulphur or imino groups possibly substituted by alkyl, hydroxyalkyl, cycloalkyl, aralkyl, aryl or acyl groups, such as the $-O-CH_2CH_2-$, $-S-CH_2CH_2-$, $-O-CH_2CH_2CH_2-$, $-S-CH_2CH_2CH_2-$, $$-\underset{\underset{CH_3}{|}}{N}-CH_2CH_2-, \text{ or } -\underset{\underset{acetyl}{|}}{N}-CH_2CH_2$$

group;

or combinations of the divalent hydrocarbon bridging members given under (a) with:

$b_2$. divalent groups containing oxygen such as carbonyl, oxalyl, sulphinyl or sulphonyl groups such as the $-CO-CH_2$, $-CO-CH_2CH_2-$, $-SO_2CH_2-$, $-SO_2-CH_2CH_2-$ or $-SO_2-CH_2CH_2CH_2$ group or $b_3$. Combinations of different divalent hydrocarbon bridging members listed under (a) with the divalent bridging members given under $(b_1)$ and $(b_2)$ wherein bridging members of different types are bound to each other such as in the $-NH-CO-CH_2-$, $-NHCO-CH_2CH_2-$, $-CONH-CH_2CH_2-$, $$-\underset{\underset{alkyl}{|}}{CON}-CH_2-CH_2-, \quad -CONH-\!\!\left\langle\!\!\begin{array}{c}S\end{array}\!\!\right\rangle$$

$-SO_2NH-CH_2CH_2-$ or $$-SO_2\underset{\underset{alkyl}{|}}{N}-CH_2CH_2-\text{ group.}$$

In the polycondensation with the conventional polyamide forming comonomers as well as in the reaction with the previously formed conventional polyamides the co-condensable monomers according to the invention of formula I produce a chemically critical radical, bound to the new light stable polymers, of formula II

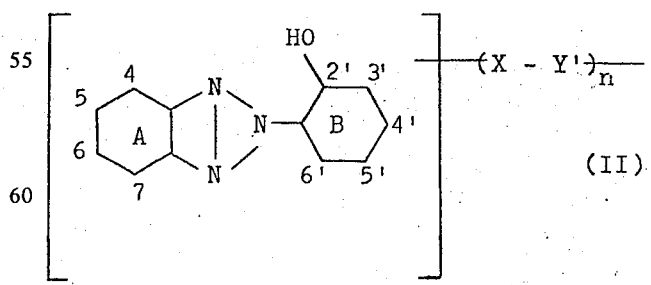

(II)

In this formula II, A, B, X and $n$ have the meanings given in formula I, and

Y' represents the carbonyl or amido moiety on the left side of the groupings:

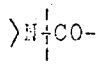

i.e. the portion of these groups formed from Y during the poly-condensation. In these groupings, the amido moieties are not bound to an unsaturated carbon atom, in other words, a trigonal carbon atom, i.e. neither an aromatic or unsaturated aliphatic carbon atom. The portions of the carboxylic acid amido groups on the right side, on the other hand, stem from the conventional comonomers or polymers.

The copolymerisable 2-(2'-hydroxyphenyl)-benzotriazole compounds according to the seventh invention aspect can be produced in three different ways:

1. by conversion, by ring closure, of a suitable substituted azobenzene compound;
2. by introduction of at least one side chain which contains at least one condensable group as defined into a 2-(2'-hydroxyphenyl)-benzotriazole; or
3. by liberation of at least one condensable group as defined in a side chain, which group, in a chemically modified or potential form, occurs at least once in a 2-(2'-hydroxyphenyl)-benzotriazole.

Examples of the method given under 1 are oxidative ring closure of a 2-amino-2'-hydroxy-1,1'-azobenzene compound, e.g. by means of salts of divalent copper in neutral to alkalin medium, or reductive ring closure of a 2-nitro-2'-hydroxy-1,1'-azobenzene compound, e.g. by means of zinc dust in alkaline medium.

The introduction of the characteristic side chain according to the invention mentioned under 2 can be done, for example, by condensation reactions, e.g. by condensation of 2-(2'-hydroxyphenyl)-benzotriazole sulphonic acid chlorides with aminocarboxylic acids, or by addition reactions, e.g. by adding acrylic acid esters to 2-(2'-hydroxyphenyl)-benzotriazole sulphinic acids, or by direct aromatic substitution, e.g. acylation with succinic or phthalic anhydride according to Friedel-Crafts, optionally followed by reduction of the keto group formed, e.g. with hydrazine according to Wolff-Kishner.

The liberation of the characteristic groups in the side chain according to the invention mentioned under 3 can be performed, for example, by cleavage reactions, such as hydrolytic cleavage e.g. by saponification of ester or nitrile groups with liberation of carboxyl groups, or hydrogenolytic reactions such as reduction of nitro or cyano groups with formation of primary amino groups.

Conventional co-condensation monomers for the production of new light stable, preferably linear polyamides are substantially equimolar mixtures, preferably the 1:1 salts of dicarboxylic acids and diamines, in particular $\omega,\omega'$-alkane dicarboxylic acids and diamines, particularly $\omega,\omega'$-alkane dicarboxylic acids having 2–12 C atoms such as oxalic acid, succinic acid, chiefly however, adipic acid and sebacic acid on the one hand, and $\omega,\omega'$-alkane diamines having 2–6 C atoms such as ethylenediamine, propylenediamine, 1,4-diaminobutane, principally however, hexamethylenediamine, also diamines having a cyclic hydrocarbon moiety such as $\alpha,\alpha'$-diamino-m-xylene or the cis and trans isomers of 1,4-diaminocyclohexane or of mixtures thereof on the other hand; $\omega$-aminocarboxylic acids or their lactams such as $\omega$-aminoundecyclic acid and caprolactam.

The second aspect of the invention concerns UV absorbant, light stable high molecular polyesters.

For it has furthermore been found, according to the eighth invention aspect that UV absorbant high molecular polyesters having improved light stability are obtained if certain 2-(2'-hydroxyphenyl)-benzotriazole compounds defined further below which, in at least one side chain of each of their molecules contain from one to two condensable aliphatically or cycloaliphatically bound hydroxyl groups or condensable groups reacting in the same way which are derived from these hydroxyl groups, are reacted at temperatures of 150°–350° with polycondensable monomers or with polycondensates thereof to form the said polyesters.

Conventional co-condensation monomers for the production of new light-stable, preferably linear polyesters are mixtures of dicarboxylic acids or diesters thereof with monohydric alcohols and of at least an equivalent amount of a dihydroxy compound such as the preferably cyclic dicarboxylic acids such as terephthalic acid and also their dimethyl, diethyl and dibutyl esters, p,p'-diphenyl sulphone dicarboxylic acid and also its diethyl and dibutyl esters, 4,4'-diphenyldicarboxylic acid and its diethyl and dibutyl esters, p,p'-1,2-diphenylethane dicarboxylic acid and its dimethyl, diethyl and dibutyl esters on the one hand and the $\omega,\omega'$-dihydroxyalkanes having preferably 2–6 C atoms such as ethylene glycol, 1,3-dihydroxypropane, 1,4-dihydroxybutane, 1,5-dihydroxypentane and 1,6-dihydroxyhexane, also cyclic dialcohols such as the cis and trans isomers of $\alpha,\alpha'$-1,4-dimethyl cyclohexane diol or mixtures thereof on the other hand.

Diesters of dicarboxylic acids with dihydric alcohols, preferably of the dicarboxylic acids mentioned with dihydric alcohols such as terephthalic acid-bis-$\beta$-hydroxyethyl ester and p,p'-diphenylsulphone dicarboxylic acid-bis-$\beta$-hydroxyethyl ester, the components mentioned being used mainly for the production of polyesters forming fibers which, however, on using bis-hexacyclic carboxylic acids, are frequently modified by the addition of aliphatic dicarboxylic acids such as succinic acid and adipic acid.

For the production of the generally not very high-molecular polyesters having a low melting point which are used as intermediates, such as are used for the production of poly-urethanes by chain extension and/or cross linking of the esters having hydroxy end groups with di- or poly- isocyanates or for the production of polyester resins by cross linking of unsaturated polyesters by addition copolymerization with ethylenically unsaturated monomers such as styrene or methyl methacrylate, also the following starting products can be employed as conventional co-condensation monomers: $\omega,\omega'$-alkane dicarboxylic acids such as succinic acid and its anhydride, adipic acid and sebacic acid, alkene dicarboxylic acids such as maleic acid and its anhydride, also itaconic acid, aromatic dicarboxylic acids such as phthalic acid and its anhydride, also chlorination products of the two latter such as tetrachlorophthalic acid, and alicyclic dicarboxylic acids such as hexahydrophthalic acid and its anhydride, 1,4,5,6,7,7-hexachlorobicyclo-[1.2.2]-5-heptene-2,3-dicarboxylic acid and its anhydride, of the dihydric alcohols, also telomers of low alkane diols such as diethylene glycol ($\beta,\beta'$-dihydroxydiethyl ether), triethylene glycol-(1,2-ethylene glycol-bis-hydroxyethyl ether) and 1,4-butylene glycolbis-$\delta$-hydroxybutyl ether.

The benzotriazole compounds co-condensable according to the first and second aspects of the invention, respectively, are polymerized with the corresponding classes of above enumerated types of comonomers by the methods conventional in polymer chemistry for the production of polyamides and polyesters, respectively, whether it be by direct heating of the components with or without solvents whereupon polyamides are formed from carboxylic acid and amines and polyesters are formed from the mono- or bis-hydroxyl compounds, or by reaction of the functional derivatives of the components, transamidations, reaction of esters with free amines, or reactions of carboxylic acid halides with amines leading to polyamides, and transesterifications and reaction of carboxylic acid halides with hydroxy compounds leading to polyesters.

Often catalysts are useful for the esterification and also the transesterification. Examples of such are simple protonic acids such as toluene sulphonic acid (or toluene sulphochloride which produces hydrogen chloride and toluene sulphonic acid during the condensation), also Lewis acids such as boron trifluoride and, mainly, the oxides of metals of the fifth group such as antimony oxide (which reacts with the organic acids present), as well as titanium compounds such as tetraalkoxytitanium and hydrates of titanium dioxide. Also basic catalysts can be used, e.g. the alkaline-earth metal salts of weak acids such as calcium acetate.

Color stabilizers such as triphenyl phosphite, antioxidants and, sometimes, delustering agents such as titanium dioxide can be added as further additives.

The molecular weight of the light stable polymers according to the invention can be controlled by the temperature and pressure conditions in the polymerization as well as by the more or less complete removal of the volatile low molecular reaction products or reaction components. Particularly in the case of polyamides, the molecular weight can also be influenced by the addition of a slight excess of one component, e.g. of sebacic acid. In general, also monofunctional substances, in the case of polyamides, e.g. acetic acid, can be added as molecular weight regulator. Such substances are termed chain stoppers. In this connection it should be noted that the 2-(2'-hydroxyphenyl)-benzotriazole compounds co-condensable according to the first and second invention aspects appear as chain stoppers when they are monofunctional. If, however, they are bifunctional, they appear as normal chain members which do not need to have any effect on the molecular weight. The latter class of compounds is thus for more general use and, therefore, is preferred.

All the substances taking part in the chain formation can be mixed together before polymerization and then polymerized. However, it is quite possible to add the benzotriazole compounds to the precondensates formed during conventional polymerizations. In an extreme case, also conventionally polymerized high polymers can subsequently be reacted with the benzotriazole compounds according to the invention and then the equilibrium of the polymer is re-adjusted. For this purpose, the high polymers obtained in the conventional way are mixed with the copolymerizable stabilizers and reacted under the same temperature conditions as in the conventional production of the starting polymers for at least half an hour. A longer reaction time is advantageous in the case of polyesters which are derived from aromatic carboxylic acids.

For the production of polyamides which absorb UV light according to the invention, the benzotriazole compounds which only contain hydroxyl groups, or derivatives thereof reacting in the same way, as reactive groups are less suitable as they only react very incompletely with the comonomers and thus are fixed in the end product only to a small extent; therefore benzotriazole compounds which contain as reactive groups only hydroxyl groups or derivatives thereof which react in the same way can only be used with good results in polyesters.

On the other hand, benzotriazole compounds which contain a thermo-unstable group or one which can be reduced, are less suitable for the production of polyamides by direct polymerisation of amines or derivatives thereof and free carboxylic acids.

Advantageously the polyamides according to the invention are produced by the following methods:

a. Direct polycondensation of the benzotriazole comonomers according to the invention with the conventional diamines and dicarboxylic acids, the latter two components being preferably used in the form of their known 1:1 salts such as, e.g. the hexamethylenediamine-adipic acid salt (6—6 salt), hexamethylenediamine-sebacic acid salt (6–10 salt), tetramethylenediamine-adipic acid salt (4–6 salt). (The production of the latter salt is described, e.g. in W. R. Sorenson and T. W. Campbell, Preparative Methods of Polymer Chemistry, Interscience Publishers, Inc., New York 1961). In this case, the benzotriazole comonomers according to the invention, if they are monofunctional, are used direct as free amines or free carboxylic acids; if they are bifunctional they are used either direct if they are aminocarboxylic acids or, if they are diamines or dicarboxylic acids, they are used with the equivalent amount of conventional dicarboxylic acids or diamines respectively. The mixture of monomers, possibly with the addition of water and/or a little phosphorous acid, is heated in a closed vessel in an atmosphere of inert gas, the steam is then slowly allowed to escape during the polymerisation, but only after there is substantially no more free, volatile diamine present. Finally the polymerisation is completed under reduced pressure in order to remove all reaction water. Temperature conditions depend on the apparatus available. Most suitable is an autoclave with which excess steam pressure can be maintained at the begining of the polymerisation and can be released during the course of the polymerisation. In the first phase of the polycondensation, the temperature is kept between 180°–290°C, preferably between 200°–270°C; during the polymerisation it should be between 250°–300°C. The reduced pressure in the end phase can be 0.01–500 mm, preferably 0.1 to 500 mm.

Naturally, various monomers of the same type can be used at the same time to modify the properties of the polymers. For example, mixtures of 6—6 salts and 6–10 salts can be reacted with the benzotriazole comonomers according to the invention to form polycondensates.

b. Polycondensation of the benzotriazole comonomers according to the invention with derivatives of conventional dicarboxylic acids and diamines: As functional derivatives of the dicarboxylic acids, mainly esters of low alkanols are employed such as, e.g. adipic acid diethyl ester or oxalic acid dibutyl ester. In this case, naturally the salts cannot be used as starting materials. Simply the amounts of free diamines are used which are necessary to balance the mixture, i.e. to cause total equivalence of carboxylic acid derivative groups and amino groups. The polymerisation in this case is performed in the same way as under (a) but the alcohols used for the production of the ester are removed during the polycondensation instead of the water.

Other functional derivatives of conventional dicarboxylic acids are their acid chlorides, e.g. adipic acid or terephthalic acid chlorides. In this case, the benzotriazole compounds according to the invention, if they are mono- or di- carboxylic acids, must also be in the form of acid chlorides. On using carboxylic acid chlorides, the polycondensation is best performed at temperatures of 0°–50°C, — room temperature is preferred —, and in two phases. The amine components are in the form of dilute aqueous solutions, an amount of base equivalent to the amount of hydrochloric acid formed being present in the solution. This base can be in the form of alkali hydroxide such as sodium hydroxide or as excess diamine. The carboxylic acid chloride components are dissolved in solvents which are not miscible with water such as methylene chloride, tetrachloroethylene. The two phases are brought into contact whereupon the polycondensation occurs at the interphase of the two phases. The polymeric film formed can either be drawn off direct or can be torn, by very good stirring, into pulverulent polymeric particles so that always new phase surfaces are formed. It is quite possible to perform such a polycondensation on natural fibres such as, e.g. wool. In this case, the fibre is saturated with the one phase and then treated with the other of the two phases.

c. Copolymerisation of ω-aminocarboxylic acids such as 11-aminoundecyclic acid, or lactams such as caprolactam with the benzotriazole monomers according to the invention: The polymerisation is generally performed as given under (a); in the case of 11-aminondecyclic acid the polymerisation can be completed also at temperatures around 210°–230°C. In the case of caprolactam as conventional comonomer, water is added to the mixture of monomers as condensation accelerator. Like the reaction water in direct condensation of carboxylic acids and amines, it is later removed.

To balance the mixture, the benzotriazole monomers according to the invention are possibly added together with the equivalent amount of conventional dicarboxylic acid or diamine as described under (a). So that there is not too great a loss of caprolactam, as an equilibrium is attained in which monomeric caprolactam takes part, the pressure in the end phase of the polymerisation, in this case, should not be brought below 400 mm.

If absolutely anhydrous starting materials are used, the caprolactam cocondensations can also be performed with the aid of strong bases such as lithium phenyl or sodium metal (which reacts with the lactam group with formation of the N-sodium compound and so forms the strong base necessary).

Preferably the polyesters forming fibers and films according to the invention are produced by the following methods:

a. Transesterification of the benzotriazole comonomers according to the invention with the conventional dicarboxylic acid esters and dihydroxy compounds. The benzotriazole compounds themselves can be used as free mono- or di- carboxylic acids and also as their esters. Advantageously an excess of dihydroxy compound is used which is removed together with the monohydric alcohols during the polycondensation. Mainly the esters of low alkanols are employed as esters of the carboxylic acids used. The mixture of monomers is heated, optionally with the addition of the catalysts mentioned, in the first phase to 150°–250°C preferably to 180°–210°C, whereupon the monohydric alcohols are distilled off and the glycol esters are formed. In the second phase the polycondensation is performed by gradually raising the temperature to 200°–350°C, preferably 260°–320°C and slowly creating a vacuum in order to remove excess dihydroxy compound. The pressure should be not more than 1 mm, preferably however, less than 0.5 mm.

b. Reaction of the benzotriazole compounds according to the invention with conventional dihydroxy compounds and dicarboxylic acid chlorides. In this case, the benzotriazole compounds are used in the form of acid chlorides if they are carboxylic acid derivatives. There are three methods, in principle, of performing the reaction:

Simple reaction of the components without solvents, care being taken that in the first phase the temperature does not rise above the point of decomposition of the acid chloride or above the point at which dihydroxy compounds are labilized by the hydrogen chloride formed. This is attained by external cooling. In this phase, combination of aromatic acid chlorides and alkane diols should preferably not be heated over 60°C; combinations with phenols can be heated up to 150°C. When the stron hydrogen chloride evolution occurring during this phase has fallen off, the temperature is raised to 140°–220°C, preferably to 150°–180°C and, to remove the hydrogen chloride, a vacuum is gradually created.

Reaction of the components in an inert solvent such as dichlorobenzenes or nitrobenzene or basic solvents having a tertiary amino group such as pyridine or dimethyl aniline: The reaction in inert solvents is performed similarly to the polycondensation without solvents, the solvents being finally removed by distillation under high vacuum. In general, the reaction in basic solvents is performed at lower temperatures of 0°–60°C, preferably at 10°–40°C. The solvent is finally removed advantageously by extraction with acidified water whereupon the polymer, after being well washed with water, is dried in vacuo.

Reaction of the components in aqueous phase analogously to the known Schotten-Baumann reaction for the esterification of monomolecular hydroxy compounds with carboxylic acid chlorides: This method is best suited for phenolic dihydroxy compounds which can be dissolved in water with the calculated amount of sodium or potassium hydroxide. In order to avoid saponification of the acid chlorides, they are used advantageously with solvents which are not miscible with water such as methylene chloride, chloroform or tetrachloroethylene. In general, very good stirring and the use of a surface active auxiliary is indicated to attain a good emulsion. This latter method is not always advantageous for the production of the polymers according to the invention as the phenolic hydroxyl group necessary for the action of the benzotriazole comonomers is easily acylated under these conditions so that less valuable polymers are obtained.

The new, unsaturated polyesters usable as intermediates for polyester resins are produced advantageously by direct esterification of the benzotriazole comonomers with maleic anhydride, optionally together with other anhydrides such as the phthalic anhydride above mentioned, and alicyclic carboxylic acid anhydrides, also however, free dicarboxylic acids such as adipic acid and glycols such as the simple alkane diols mentioned or their telomers. Here the temperatures should not be kept so high as in the production of the polyesters forming fibers. Generally heating to 170°–220°C is sufficient. Also the vacuum created at the end is less, generally pressures of 100–200 mm are sufficient to attain the desired molecular weight.

The amount of co-condensable 2-(2'-hydroxyphenyl)-benzotriazoles used for the production of light stable polymers according to the invention depends on their type as well as on the intended use of the new condensation polymers. Mono-functional benzotriazole compounds can amount to 0.1 to 5% of the total weight of the finished polymer, in high polymers however, preferably not above 0.5% as otherwise the degree of polymerization suffers. On proper balancing of the monomer mixture, bifunctional benzotriazole compounds can be used in amounts of 0.1 to 10% of the total weight of the finished polymer. If the polymer according to the invention is used directly as such, amounts of 0.1 to 1% are the most advantageous. If, however, the polycondensate is used in a physical blend with conventional polymers or if it is further modified, as is the case with unsaturated polyesters for polyester resins or intermediate products for polyurethanes, higher percentages of from 0.2 to 10% are preferred.

Depending on the substitution of the 2-(2'-hydroxyphenyl)-benzotriazole compound used for their production, the light-stable polycondensates obtained are completely colorless to very pale yellow colored. In film form they are translucent to completely clear. They are distinguished by their light stability but they are also permanent UV filters as their UV-absorbing property cannot be destroyed by extraction agents without decomposition of their physical form. The UV absorption is not lost in the usual way on heating for a longer time, this even when the heating is done in vacuo. The new polymers can be used technically, for example, in the form of films as packing material or as shielding material, also as coating materials, as construction elements and as filaments for textile or technical purposes. They are worked up in the usual way, depending on their physical properties, e.g. by injection moulding or casting. It should be noted here that the other usual physical properties such as, e.g. the mechanical properties, of the polymers according to the invention are very similar in the starting condition to those of analogous conventional polymers, i.e. to those of corresponding polymers without copolymerised 2-(2'-hydroxyphenyl)-benzotriazole compounds. This means that, in general, the polymers according to the invention can be worked up in the same way as the latter. The difference between the two sorts of polymers becomes apparent in the extension of the possibilities of application and also in the improvement of the life of the physical properties.

To summarize, the preferred polymers according to the first invention aspect are linear polycarbonamide condensates and preferably polyamide condensates containing as an integral unit the moiety of formula which moiety is at least once and at most twice bound to the remainder of the polyamide macromolecule by at least one of said "Y" moieties and by at most one further moiety which is either one of said Y moieties or a carbonyl moiety, which carbonyl moiety is bound to the 4-, 5- or 6-position, preferably the 5-position, of nucleus A. The formula III-moiety is equivalent to the formula II-moiety set forth above.

In the formula III-moiety, the nucleus A is a monocyclic arylene radical, if desired substituted in preferably at most two of the positions 4-, 5- or 6- by non-reactive substituents as set forth with respect to the like portion in the preferred corresponding monomer of formula I on page 2 of the specification. Of course one of said 4-, 5- or 6-positions can carry a carboxy or carbalkoxy group either one of which would take part in the polymerization yielding the carbonyl moiety referred to in the formula III moiety. The nucleus B is a monocyclic arylene radical which with the hydroxy at the 2'-position can be substituted in preferably at most two of the 3'-, 4'- or 5'-positions.

E is an alkylene radical of from 1 to 4 carbon atoms, e, f, n and q are independently integers from one to two, with the limitations that (1) f must be at least as large as e, and (2) the sum of q + n is at most 3, F' is a member selected from the group consisting of —O—, —S—, —SO₂—, —SO₂NH—, —CONH— and

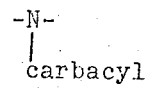

G' is a hydrocarbon radical of from 1 to 7 carbon atoms, the valency of which radical mathematically equals q plus one, with the limitation that, if G' is bound to at least two heteroatoms one of which pertains to F' as defined and the other to Y'', each of said heteroatoms is bound to a different carbon atoms of G', and Y'' is a member selected from the group consisting of carbonyl and imino, with the limitation that when Y'' is imino, Y'' must be bound to a saturated carbon atom contained in said G', each radical

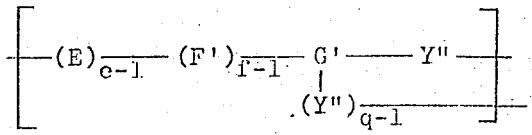

being lined with the free bond at the (E)ₑ₋₁ end thereof to one of the positions 3', 4' or 5' of ring B or to position 5 of ring A.

Preferred subclasses of linear polycarbonamides according to the invention possessing improved light stability contain as integral parts condensed in their molecules from 0.1 to 10%, based on the total weight of the

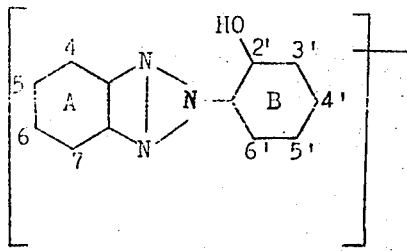
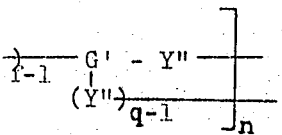

(III)

polymer, of at least one ultraviolet light-absorbing agent of the formula

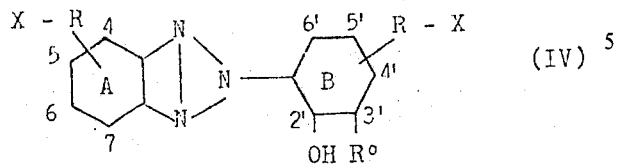

wherein R is divalent hydrocarbon of 1 to 7 carbon atoms; X is selected from the group consisting of hydrogen, carboxy and amino, with the proviso that at least one X be amino or carboxy, and R° is selected from the group consisting of hydrogen and lower alkyl, and more particularly of the formula

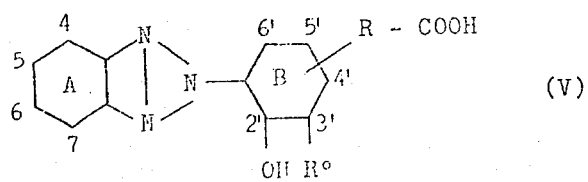

wherein R is alkylene of from 1 to 7 carbon atoms, and R° is a member selected from the group consisting of hydrogen and lower alkyl;
and/or they have as integral part condensed therein, in the last mentioned range of proportions at least one moiety of the formula

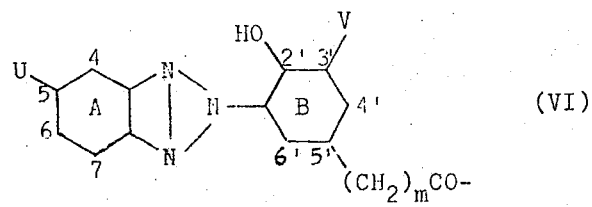

wherein
U is a member selected from the group consisting of hydrogen, —CO— and —SO$_2$NHCH$_2$CO— the latter member being linked to said A nucleus through the —SO$_2$— moiety.

V is a member selected from the group consisting of hydrogen and methyl,
m is an integer from one to three, inclusive, and/or at least one moiety of the formula

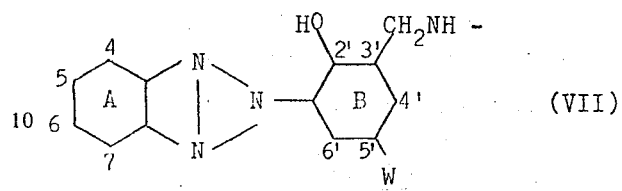

wherein
W is a member selected from the group consisting of methyl and cyclohexyl.

Polymers according to the second aspect of the invention are linear polyester condensates containing, preferably in an amount of 0.1 to 10 percent, calculated on the total weight of the polymer, chemically bound in the molecules of the said polyester, moieties of the formula II, in which, however, Y' represents

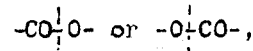

all other explanations given hereinbefore for Formula II symbols applying also in this case, and preferably moieties of the formula

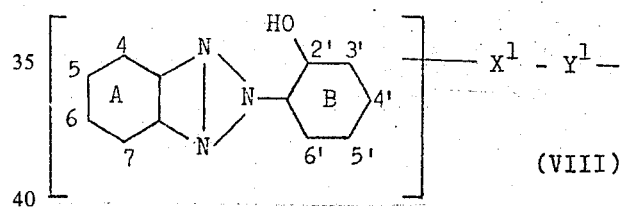

in which the sidechain —X¹—Y¹— represents one of the divalent and trivalent radicals
—N*H —CO —CH$_2$ —CO —, —N*H —CO —CH$_2$CH$_2$ —Y¹—

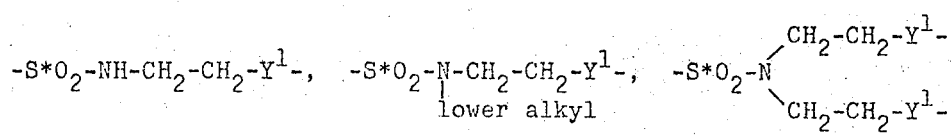

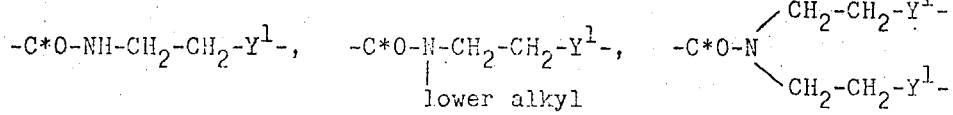

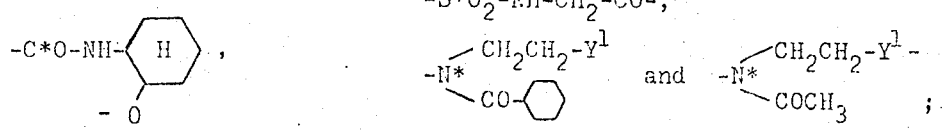

Y¹ represents -CO or -O- ;

the sidechain —X¹—Y¹ being bound by the atom designated by (*) to rings A or B, and preferably to the 5-position of ring A or to one of the 3'-, 4'- or 5'-positions of ring B;

the bridging member Y¹ of formula VIII, when being —CO—, is linked to an —O— grouping, and when it is —O—, it is linked to a —CO— grouping of the linear polyester molecule.

In the moiety of Formula VIII, ring B is further substituted preferably in 3' and/or 5'- positions not occupied by the grouping —X¹—Y¹—, by the following: hydrogen, lower alkyl of from 1 to 4 carbon atoms, chlorine, cyclohexyl, benzyl, phenyl or carboxyethyl.

Position 6' at ring B may also be substituted by a lower alkyl group, especially methyl.

Most preferred among these polyesters are those linear polyesters which contain chemically bound from about 0.1 to 10 percent, based on the total weight of the polyester, of a moiety of the formula

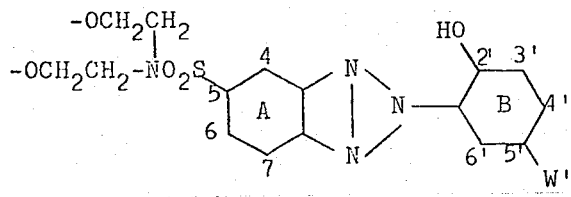

wherein W' is a member selected from among hydrogen, methyl, cyclohexyl, benzyl, phenyl and chlorine, or of a moiety of the formula

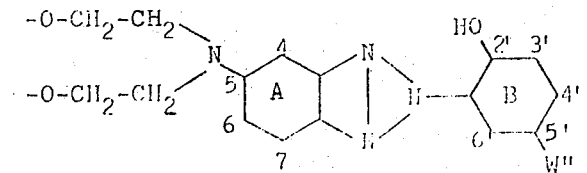

wherein W'' is a member selected from among hydrogen, methyl, cyclohexyl, benzyl and chlorine.

The conventional monomeric material employed has been set forth hereinbefore. Summarizing it comprises (A) substantially equimolar mixtures of dicarboxylic acids and diamines, (B) ω-amino carboxylic acids and-/or the lactams thereof, or (C) mixtures of (A) and (B).

The following non-limitative examples illustrate the invention. Where not otherwise stated, parts and percentages are given by weight. The temperatures are in °C. The relationship of parts by weight to parts by volume is as that of kilograms to liters.

EXAMPLE 1

300 Parts of caprolactam, 2 parts of 2-(2'-hydroxy-5'-β-carboxyethlphenyl)-benzotriazole (compound 1/1), and 30 parts of water are heated in an autoclave within 1 hour to 255°–265° while excluding oxygen and then the steam pressure generated is gradually released over a further 4 hours at the same temperature. The polymer is kept for another hour under slightly reduced pressure (500 mm Hg) in order to remove all the water from the polymer. The polymer is then extruded under nitrogen pressure through a die fitted into the bottom of the autoclave as a monofilament of 100 den. strength and wound, cold-stretched immediately in a ratio of 1:4.5 and, to remove monomeric caprolactam (about 10%), is extracted with water.

The yarn so produced absorbs UV light and is suitable for the production of UV-absorbant fabrics.

The UV absorption is stable to alkaline washing, although a slight temporary change in color towards yellow occurs. Rinsing with a 1% acetic acid solution can greatly accelerate the disappearance of this discoloration.

If instead of the compound used above, the same number of parts of 2-(2'-hydroxy-5'-methylphenyl)-benzotriazole is used, then a monofilament which originally is very similar is obtained but the UV absorber therein can be substantially completely removed therefrom by washing with alkaline washing agents, e.g. with soda soap.

The use of 2 parts of the following compounds instead of the carboxylic acid used above produces polycaprolactam which can be worked up into yarns or injection mouldings which have very similar properties to the polymer described above:

| | |
|---|---|
| 1/2 | 2-(2'-hydroxyphenyl)-5-carboxymethoxy-6-methyl-benzotriazole, |
| 1/3 | 2-(2'-hydroxy-3'-o-carboxyphenylmethyl-5'-methylphenyl)-benzotriazole, |
| 1/4 | 2-(2'-hydroxy-5'-N-β-carboxyethyl-benzoyl-amidophenyl)-benzotriazole, |
| 1/5 | 2-(2'-hydroxy-3'-aminomethyl-5'-methylphenyl)-benzotriazole, |
| 1/6 | 2-(2'-hydroxy-5'-methylphenyl)-benzotriazole-5-sulphonic acid carboxymethylamide, |
| 1/7 | 2-(2'-hydroxy-3'-methyl-5'-β-carboxyethylphenyl)-benzotriazole-5-sulphonic acid-β-hydroxyethylamide, |
| 1/8 | 2-(2'-hydroxyphenyl-5'-β-carbethoxyethylphenyl)-benzotriazole, |
| 1/9 | 2-(2'-hydroxy-3'-methyl-5'-β-carboxyethylphenyl)-benzotriazole, |
| 1/10 | 2-[2'-hydroxy-4'-[2'',5''-dioxopyrrolidinyl-1'')]-phenyl]-benzotriazole, |
| 1/11 | 2-(2'-hydroxy-3'-aminomethyl-5'-methylphenyl)-benzotriazole-5-carboxylic acid, |
| 1/12 | 2-(2'-hydroxy-3',5'-dimethylphenyl)-5-β-carboethoxy-ethylmercapto-benzotriazole, |
| 1/13 | 2-(2'-hydroxy-3',5'-dimethylphenyl)-benzotriazole-5-β-carboethoxyethyl sulfone, |
| 1/14 | 2-(2'-hydroxy-3'-β-methyl-γ-carboxymethylmer-captopropyl-5'-methylphenyl)-benzotriazole, |
| 1/15 | 2-(2'-hydroxy-3'-β-methyl-γ-carboxyethylmer-captopropyl-5'-methylphenyl)-benzotriazole, |
| 1/16 | 2-(2'-hydroxy-3'-o-carbobutoxyphenylmethyl-5'-methylphenyl)-benzotriazole, |
| 1/17 | 2-(2'-hydroxy-4'-β-carbobutoxyethylphenyl)-benzotriazole-5-ethyl sulfone, |
| 1/18 | 2-(2'-hydroxy-3'-o-carboxyphenylmethyl-5'-methylphenyl)-benzotriazole, |
| 1/19 | 2-(2'-hydroxy-3'-o-carbobutoxyphenylmethyl-5'-methylphenyl)-benzotriazole, |
| 1/20 | 2-(2'-hydroxy-3'-methyl-5'-β-carboxyethylphenyl)-5-methoxy-benzotriazole, |
| 1/21 | 2-(2'-hydroxy-3'-methyl-5'-β-carboxyethylphenyl)-5-butoxy-benzotriazole, |
| 1/22 | 2-(2'-hydroxy-3'-methyl-5'-β-carbomethoxyethylphenyl)-benzotriazole-5-carboxylic acid methyl ester, |
| 1/23 | 2-(2'-hydroxy-5'-tert.butylphenyl)-benzotriazole-5-sulfonic acid carboxymethylamide, |
| 1/24 | 2-(2'-hydroxy-5'-cyclohexylphenyl)-benzotriazole-5-sulfonic acid carboxymethylamide, |
| 1/25 | 2-(2'-hydroxy-5'-benzylphenyl)-benzotriazole-5-sulfonic acid carboxymethylamide, |
| 1/26 | 2-(2'-hydroxy-5'-phenylphenyl)-benzotriazole-5-sulfonic acid carboxymethylamide, |
| 1/27 | 2-(2'-hydroxy-3'-β-carboxypropionylamidomethyl-5'-methylphenyl)-benzotriazole, |
| 1/28 | 2-(2'-hydroxy-3'-β-carboxypropionylamido-5'-methylphenyl)-benzotriazole, |
| 1/29 | 2-(2'-hydroxy-4'-β-carboxypropionylamidophenyl)-benzotriazole, |
| 1/30 | 2-(2'-hydroxyphenyl)-5-β-carboxypropionylamido-benzotriazole, |
| 1/31 | 2-(2'-hydroxy-3',5'-dichlorophenyl)-5-N-β-carboxyethyl-acetamido-6-methyl-benzotriazole. |

EXAMPLE 2

A mixture of 294 parts of maleic acid anhydride and 2 parts of 2-(2'-hydroxy-5'-β-carboxyethylphenyl)-benzotriazole-5-sulfonic acid carboxymethylamide (compound 2/1) and 94 parts of phthalic acid anhydride is added to 212 parts of diethylene glycol and 124 parts of ethylene glycol in a 5-necked flask fitted with stirrer, thermometer; gas inlet tube and a sampling device and a sloping condenser. The addition is made in portions while introducing pure nitrogen at 80°–85°. The mixture is carefully warmed as, soon after further heating, an exothermic reaction occurs for the duration of which the heat must be stopped. On completion of the exothermic reaction, the mixture is heated for 1.5 hours at 150°, then within 5 hours to 200°. This temperature is maintained until the acid number of a small sample is less than 70. The temperature is then lowered to 180° and a vacuum is slowly created until the pressure has fallen to 100 mm (care, the mixture foams if the vacuum is suddenly created). Stirring is continued under these conditions until the acid number has decreased to under 30. It is then cooled in an atmosphere of nitrogen and at about 100°, 0.06 parts of o-hydroxy-p-tert. butyl phenol are added as polymerisation inhibitor.

The polyster so obtained is suitable for the production of light-stable polyester resin plates. For this purpose, 100 parts of the polyester are diluted with 43 parts of styrene at a raised temperature (80°–100°). 0.5 Parts of benzoyl peroxide are stirred well into 100 parts of the liquid resin obtained and the mixture is cured between two glass plates serving as a mould for plates by heating for 3 hours at 80°.

If the same amount of the substances given below is used instead of the 2-(2'-hydroxy-5'-β-carboxyethylphenyl)-benzotriazole mentioned, then unsaturated polyester having very similar properties is obtained which can be made into polyester resin plates in the same way:

| | |
|---|---|
| 2/2 | 2-(2'-hydroxy-3',5'-dimethylphenyl)-benzotriazole-5-sulfonic acid-di-β-hydroxyethyl amide, |
| 2/3 | 2-(2'-hydroxy-5'-tert.butylphenyl)-benzotriazole-5-sulfonic acid carboxymethylamide, |
| 2/4 | 2-(2'-hydroxy-5'-cyclohexylphenyl)-benzotriazole-5-sulfonic acid carboxymethylamide, |
| 2/5 | 2-(2'-hydroxy-5'-benzylphenyl)-benzotriazole-5-sulfonic acid carboxymethylamide, |
| 2/6 | 2-(2'-hydroxy-5'-phenylphenyl)-benzotriazole-5-sulfonic acid carboxymethylamide, |
| 2/7 | 2-(2'-hydroxy-3'-β-carboxypropionylamidomethyl-5'-methylphenyl)-benzotriazole, |
| 2/8 | 2-(2'-hydroxy-3'-β-carboxypropionylamido-5'-methylphenyl)-benzotriazole, |
| 2/9 | 2-(2'-hydroxy-4'-β-carboxypropionylamidophenyl)-benzotriazole, |
| 2/10 | 2-(2'-hydroxyphenyl)-5-β-carboxypropionylamidobenzotriazole, |
| 2/11 | 2-(2'-hydroxy-5'-methylphenyl)-benzotriazole-5-carboxylic acid-β-hydroxyethylamide, |
| 2/12 | 2-(2'-hydroxy-5'-methylphenyl)-benzotriazole-5-carboxylic acid-2''-hydroxycyclohexyl-1''-amide, |
| 2/13 | 2-(2'-hydroxy-3',5'-dichlorophenyl)-5-N-β-carboxyethylacetamido-6-methyl-benzotriazole, |
| 2/14 | 2-(2'-hydroxy-3',5'-dimethylphenyl)-benzotriazole-5-sulfonic acid-N-butyl-N-β-hydroxyethylamide, |
| 2/15 | 2-(2'-hydroxy-5'-N-β-carboxyethyl benzoyl amidophenyl)-benzotriazole. |

EXAMPLE 3

If 70 parts of 2-(2'-hydroxy-5'-β-carboxyethylphenyl)-benzotriazole-5-sulfonic acid carboxymethylamide (compound 3/1 identical with compound 2/1) are used instead of the 2 parts used in example 2 and if 70 parts of phthalic acid anhydride are used instead of the 94 parts and otherwise the procedure described in example 2 is followed, then an unsaturated polyester is obtained which can be used as a light-stable master batch useful for diluting conventional liquid polyester resins. To attain suitable mixtures, 2–6 parts of this polyester are well mixed with 98–94 parts of a conventional polyester, such as is obtained, e.g. by the process according to example 2 but without the addition of the benzotriazole comonomer, and 40–45 parts of methyl methacrylate. On the addition of e.g. 0.5% of benzoyl peroxide in the warm, such liquid polyester resins can be cured to form light-stable polyester resin plates.

The monofunctional compounds mentioned in example 2 are not suitable for the production of the above polyester. Similar polyester which can be diluted with commercially available polyesters is obtained on using 67.5 parts of

| | |
|---|---|
| 3/2 | 2-(2'-hydroxy-3',5'-dimethylphenyl)-benzotriazole-5-sulfonic acid-di-β-hydroxyethylamide | in the above process along with 94 parts of phthalic acid but only 114 parts of ehtylene glycol.

EXAMPLE 4

A mixture of 25.0 parts of 1,4-cyclohexane dicarbinol (produced according to W. R. Sorenson and T. W. Campbell, Preparative methods of polymer chemistry; Interscience Publishers Inc., New York, 1961 page 114), 0.1 parts of 2-(2'-hydroxy-5'-methylphenyl)-benzotriazole-5-carboxylic acid-β,β'-dihydroxydiethylamide (4.1), 12.5 parts of terephthalic acid dimethyl ester and 0.02 parts of tetrabutyl titanate is put into an autoclave. The autoclave is made from V4A stainless steel equipped with sealed stirrer, a manometer, thermometer, two valves in the lid and an exit valve fitted with an exchangeable die in the bottom and it has a content of 1.5 liters. It is heated by a Dow Therm heating mantle in which the temperature is controlled by external pressure. The mixture is heated within 2 hours to 200° while excluding oxygen and the methanol formed is continuously distilled off. The temperature is then maintained for 2 hours, then raised within 2 hours to 285° after which a vacuum is slowly created (care because of foaming) so that a pressure of 0.2 mm is attained within half an hour. Condensation is performed under these conditions for 2 hours. After raising the temperature for a short time to 300°, the polymer formed is pressed out with nitrogen through the bottom valve fitted with a slit die. The band so formed is guided through a water bath. In the same way, on using a multiple hole die, endless filaments can also be produced. The cooling through the water bath is then superfluous.

The bands so obtained absorb UV light and are less prone to embrittlement on exposure to light than bands produced in the same way but without light stabiliser. They can be cut into chips which, after well drying, can be used for the production of injection mouldings.

EXAMPLE 5

In the autoclave described in example 4, a mixture of 60 parts of p,p'-dicarbo-β-hydroxyethyldiphenyl sulfone (produced according to U.S. Pat. No. 2,614,120, J. R. Caldwell), 9 parts of adipic acid, 0.1 part of calcium acetate-dihydrate, 0.02 part of antimony trioxide and 0.3 part of 2-(2'-hydroxy-5'-β-carboxyethylphenyl)-benzotriazole-5-carboxylic acid-β-hydroxyethylamide (compound 5/1) is slowly heated to 220° while excluding oxygen and this temperature is maintained for 3 hours. The temperature is then raised to 285° and after 1 hour at this temperature a vacuum is slowly created so that a pressure of 0.1 mm is attained within half an hour. Condensation is completed under these conditions for 2.5 hours. The polymer obtained is pressed out from the slit die with nitrogen and guided through a water bath. The polymer obtained can be worked up into UV dense injection mouldings which are more resistent to embrittlement on exposure to light than polymers produced analogously but without light stabilisers.

EXAMPLE 6

1000 parts of terephthalic acid dimethyl ester, 750 parts of ethylene glycol, 25 parts of 2-(2'-hydroxyphenyl)-5-β-carboxypropionylamido-benzotriazole (compound 6/1), and 0.4 parts of $Sb_2O_3$ (as transesterification catalyst), are reacted in an autoclave described in example 4 in an atmosphere of nitrogen at 220° for 4 hours, methanol being continuously distilled off. The pressure in the reaction vessel is then gradually reduced to 20 mm Hg whereupon glycol is distilled off. Finally the temperature is raised to 285°, the pressure reduced to 0.2 mm Hg and the condensation is completed under these conditions for 2 hours. The polymer is pressed out by nigrogen through the bottom valve to form a monofilament of 200 den. After cooling in a water bath it is wound in the form of an endless yarn.

The monofilament obtained absorbs UV light. This property is not adversely influenced by repeated washing with soda/soap.

If, on the other hand, a mixture of commercially available polyethylene glycol terephthalate chips and 2-(2'-hydroxy-5'-cyclohexyl-phenyl)-benzotriazole are melted in an autoclave equipped with a spinnerette and threads are produced therefrom as described above, then the UV absorbant property is not stable to aklaline washing.

If, instead of the compound mentioned above, the same amount of the stabilisers given below is used for the production of polycondensation compounds, then products are formed which have properties very similar to those of the polymer described above. By extruding chips obtained from the monofilament, clear films can be obtained which have very good light stability and UV absorption which is stable to sublimation:

6/2  2-(2'-hydroxy-3'-β-carboxypropionylamidomethyl-5'-methylphenyl)-benzotriazole,
6/3  2-(2'-hydroxy-3'-β-carboxypropionylamido-5'-methylphenyl)-benzotriazole,
6/4  2-(2'-hydroxy-4'-β-carboxypropionylamidophenyl)-benzotriazole,
6/5  2-(2'-hydroxy-5'-methylphenyl)-benzotriazole-5- carboxylic acid-β-hydroxyethylamide,
6/6  2-(2'-hydroxy-5'-methylphenyl)-benzotriazole-5- carboxylic acid-2''-hydroxycyclohexyl-1''-amide.

EXAMPLE 7

300 Parts of hexamethylenediamine salt of adipic acid (AH salt), 2 parts of 2-(2'-hydroxy-3'-methyl-5'-β-carboxyethylphenyl)benzotriazole-5-carboxylic acid (compound 7/1), and 100 parts of water are heated for 1.5 hours at 275°–280° in an autoclave under careful exclusion of oxygen and the steam pressure generated is released within a further 5 hours at the same temperature. The polymer formed is kept for another hour under a light vacuum (beginning at 400 mm then rising to 50 mm Hg) in order to remove the last traces of water. The polymer is then extruded under nitrogen pressure through a die in the bottom of the autoclave into a rod about 2 mm thick and this, after cooling, is cut into small chips.

The chips so prepared are extruded into a film which has a pale yellowish tinge. It is washed with 1% formic acid solution in water whereupon the yellow tinge disappears. The film absorbs substantially all UV light up to about 370 μ and on exposure it shows a much smaller loss of its physical properties than a film produced without using the benzotriazole as comonomer but which is otherwise treated identically. On extracting the UV dense film with soap water or cyclohexane, only a small part of the benzotriazole compound used can be dissolved out of the film, the remainder is securely bound and also cannot be removed by repeated extractions.

Very similar polymers are obtained if, under the same conditions, the same amount of the following compounds is used instead of compound 7/1:

7/2  2-(2'-hydroxy-5'-β-carboxyethylphenyl)-benzotriazole-5-sulfonic acid amide,
7/3  2-(2'-hydroxy-5'-β-carboxyethylphenyl)-benzotriazole-5-sulfonic acid butylamide,
7/4  2-(2'-hydroxy-5'-β-carboxyethylphenyl)-benzotriazole-5-sulfonic acid benzylamide,
7/5  2-(2'-hydroxy-5'-β-carboxyethylphenyl)-benzotriazole-5-sulfonic acid-γ-methoxypropylamine,
7/6  2-(2'-hydroxy-5'-β-carboxyethylphenyl)-benzotriazole-5-sulfonic acid-N-methylcyclohexylamide,
7/7  2-(2'-hydroxy-5'-β-carboethoxyethylphenyl)-benzotriazole-5-carboxylic acid ethyl ester,
7/8  2-(2'-hydroxy-5'-β-carbocyclohexyloxyethylphenyl)-benzotriazole-5-carboxylic acid cyclohexyl ester,
7/9  2-(2'-hydroxy-5'-β-carboxyethylphenyl)-benzotriazole-5-carboxylic acid-N-methylcyclohexylamide,
7/10  2-(2'-hydroxy-3'-cyclohexyl-5'-methylphenyl)-benzotriazole-5-sulfonic acid-carboxymethylamide,
7/11  2-(2'-hydroxy-3'-benzyl-5'-methylphenyl)-benzotriazole-5-sulfonic acid carboxymethylamide,
7/12  2-(2'-hydroxy-5'-phenylphenyl)-benzotriazole-5-carboxylic acid carboxymethylamide,
7/13  2-(2'-hydroxy-3'-tert.butyl-5'-methylphenyl)-benzotriazole-5-carboxylic acid carboxymethylamide.

The following co-condensable benzotriazole compounds can also be used but these are comonomers which are only partially copolymerised. Up to 70% of the comonomer remains unreacted and can be washed out of films or filaments made from the polymer by repeated alkaline washing:

7/14  2-(2'-hydroxy-3'-acetylamidomethyl-5'-cyclohexylphenyl)-benzotriazole,
7/15  2-(2'-hydroxy-3'-heptylcarboxylic acid benzylamidomethyl-5'-methylphenyl)-benzotriazole,
7/16  2-(2'-hydroxy-3'-formylheptylamidomethyl-5'-methoxyphenyl)-benzotriazole,
7/17  2-[2'-hydroxy-3'-(2''-oxo-hexamethyleneimidomethyl)-5'-butoxyphenyl]-benzotriazole.

EXAMPLE 8

80 Parts of hexamethylenediamine salt of sebacic acid (6–10 salt), 20 parts of hexamethylenediamine salt of adipic acid (6—6 salt), 2 parts of 2-(2'-hydroxy-5'-β-carboxyethylphenyl)-benzotriazole-5-carboxylic acid (compound 8/1, identical with compound 7/1), and 0.7 parts of hexamethylenediamine and 30 parts of water are reacted as described in example 7. The polyamide obtained has a yellowish color which almost completely disappears on long storage or on rinsing with dilute acetic acid. It is suitable for injection mouldings, particularly as light stable cover for cables.

Similar results are obtained if instead of the above mentioned 2-(2'-hydroxy-5'-β-carboxyethylphenyl)-benzotriazole-5-carboxylic acid equivalent amounts of the following compounds are used:

| | |
|---|---|
| 8/2 | 2-(2'-hydroxy-3'-δ-carboxybutyl-5'-methylphenyl)-benzotriazole-5-carboxylic acid, |
| 8/3 | 2-(2'-hydroxy-5'-3'',4''-dicarboxycyclohexyl-(1'')-phenyl)-benzotriazole, |
| 8/4 | 2-[2'-hydroxy-5'-1''-methyl-3'',4''-dicarboxycyclohexyl-(1'')-phenyl]-5-methyl-benzotriazole, |
| 8/5 | 2-(2'-hydroxy-3'-o-carboxyphenylmethyl-5'-chlorophenyl)-benzotriazole-5-carboxylic acid, |
| 8/6 | 2-(2'-hydroxy-5'-α,β-dicarboxyethylphenyl)-benzotriazole, |
| 8/7 | 2-(2'-hydroxy-5'-β-carboxyethylphenyl)-benzotriazole-5-sulfonic acid carboxymethylamide. |

EXAMPLE 9

A solution of 4 parts of sebacic acid dichloride and 0.01 part of the dichloride of 2-(2'-hydroxy-5'-β-carboxyethylphenyl)-benzotriazole-5-carboxylic acid (compound 9/1; produced from the free acid by reaction with thionyl chloride in chlorobenzene by the usual methods) and 100 parts by volume of tetrachloroethylene is carefully covered with a solution of 5 parts of hexamethylenediamine in 60 parts by volume of water. An insoluble film immediately forms at the interphase. It is picked up and wound onto a drum in such a way that a continuous band results from the continuously re-forming film. The polymer so obtained is washed several times with dilute alcohol to which a few drops of glacial acetic acid have been added and is then dried in vacuo. It is suitable for the prduction of UV dense films.

Similar results are obtained if instead of the aforesaid acid dichloride equivalent amounts of the acid chlorides of the following acids are used:

| | |
|---|---|
| 9/2 | 2-[2'-hydroxy-5'-[5'',6''-dicarboxy-bicyclo-(1,2,2)-heptyl-(2'')]-phenyl]-5-chloro-benzotriazole, |
| 9/3 | 2-(2'-hydroxy-3'-methyl-5'-β-carboxyethylphenyl)-5-chloro-benzotriazole. |

The benzotriazole compounds used in the examples above are prepared as follows:

a. By reductive ring closure of the corresponding 2-nitro-2'-hydroxy-1,1'-azobenzene dyestuffs. (The latter are obtained by coupling suitably substituted o-nitroaniline compounds with phenol compounds, coupling occurs in o-position to the hydroxyl group). These are the compounds: 1/1, 3, 4, 6, 7, 9, 20, 21, 23, 24, 25, 26; 2/1, 3, 4, 5, 6, 15; 3/1; 7/1, 2, 3, 4, 5, 6, 9, 10, 11; 8/1, 3, 4, 5, 6, 7. The 3-nitro-4-aminobenzenesulfonyl carboxymethylaminde required, e.g. for compound 1/6 is obtained by reaction of 3-nitro-4-chlorobenzenesulfonyl chloride with glycine in soda-alkaline solution at room temperature and subsequent reaction under pressure with aqueous ammonia solution at 120°–140°. The coupling components for 1/7, 2/2, 2/14, 7/2, 7/3, 7/4, 7/5 and 7/6 are obtained by reaction with the corresponding amine. The carboxylic acid amides used, e.g. 2/11, 2/12, 4/1, 5/1, 7/9, 7/12, etc. are produced analogously if, instead of the sulfonyl chloride, the carboxylic acid chloride is used. The coupling component for 1/3 is produced from 2-hydroxy-5-methyl-1,1' -benzophenone-2'-carboxylic acid by reduction with zinc dust in alkaline solution. The coupling components for 8/5 are produced analogously from 2-hydroxy-5-chloro-1,1'-benzophenone-2'-carboxylic acid. The coupling components for 1/1, etc. and 1/9, etc. are produced by saponification of the phenylpropionitriles which, in turn are produced by adding acrylonitrile to phenol or o-cresol using aluminium chloride as catalyst. The coupling component for 8/2 is produced by reducing the keto compound obtained from p-cresol and glutaric anhydride according to Clemmensen or Wolff-Kishner. The coupling components for 8/3, 8/4 and 9/2 are obtained by acid-catalyzed addition of dimethyl cyclohexenedicarboxylate (from butadiene), dimethyl methylcyclohexenedicarboxylate (from isoprene) and dimethyl bicycloheptenedicarboxylate (from cyclopentadiene), by the Diels-Alder syntheses, to phenol followed by saponification of the esters. Instead of the compounds mentioned, their anhydrides can also be used as co-condensable monomers. The coupling component for 1/4 is produced from N-β-cyanoethyl-p-aminophenol by alkaline saponification and subsequent benzoylation at pH 4–7.

b. By oxydative ring closure from the corresponding 2-amino-2'-hydroxy-1,1'-azobenzene compounds. (The latter are obtained by coupling diazotised, optionally O-substituted o-hydroxyaminophenols with aniline derivatives, coupling occurs in o-position to the hydroxyl group, and optionally liberating the hydroxyl group). These are the compounds 1/2 (as diazo component o-aminophenyl p-toluenesulfonate is used, after ring closure the tosyl group is split off by saponification), and 2/13 (the carboxylic acid used as coupling component is produced from N-β-cyanoethyl aniline by saponification of the nitrile group, nitration in a large excess of sulfuric acid followed by reduction of the nitro group). On completion of the ring closure, the product is then N-acylated.

c. By esterification of the corresponding carboxylic acids with the alcohols necessary. Compounds 1/8, 1/16, 1/17, 1/22, 7/7, 7/8 are produced in this way.

d. By acylation of the corresponding amino-2-(2'-hydroxyphenyl)-benzotriazole compounds with succinic anhydride by simply heating the components. The compounds 1/27, 1/28, 1/29 and 1/30 are obtained by this method. The compound 1/5 which serves as starting material for the production of 1/27, is produced by acid hydrolysis of the reaction product of 2-(2'-hydroxy-5'-methylphenyl)-benzotriazole and the N-methylolamide of heptanecarboxylic acid in concentrated sulfuric acid (according to Einhorn).

e. By acylation of corresponding amino-2-(2'-hydroxyphenyl-benzotriazole compounds with succinic anhydride in chlorobenzene with p-toluenesulfonyl chloride as catalyst and continuous removal of the water formed by distillation; the compound 1/10 is obtained in this way from compound 1/5.

f. By acylation of the corresponding amino alcohols with benzotriazole-carboxylic acid chlordies or sulfonyl chlorides. Compounds 2/2, 2/11, 2/12, 2/14 and 4/1 are obtained in this way. The acid chlorides necessary are obtained from the acids by reaction with thionyl chloride.

g. By addition of acrylic acid derivatives to benzotriazole compounds. The two substances 1/12 and 1/13 are so obtained. The sulfinic acid and the mercaptan necessary are produced from 2-(2'-hydroxy-3',5'-dimethyl-phenyl)-benzotriazole-5-sulfonyl chloride by reduction with sodium sulfite and by reduction with zinc dust and glacial acetic acid respectively.

h. Compounds 7/14, 16 and 17 are produced by reaction of the corresponding N-methylolamides with the corresponding 2-(2'-hydroxyphenyl)-benzotriazoles unsubstituted in the 3'-position in sulfuric acid according to Einhorn.

i. Compound 7/15 is produced by acylation of the amine with caprylyl chloride. The amine used as starting material is obtained from 1/5 by reaction with benzaldehyde and catalytic reduction of the benzal compound.

k. By addition of thioglycolic acid or β-thiopropionic acid to 2-(2'-hydroxy-3'-β-methylallyl-5'-methyl-phenyl)-benzotriazole. The latter is obtained by Claisen rearrangement of the reaction product from methallyl chloride and 2-(2'-hydroxy-5'-methyl-phenyl)-benzotriazole. Compounds 1/14 and 1/15 are obtained in this way.

The operations listed above are performed by the usual methods.

What is claimed is:

1. A linear polycarbon amide containing chemically bounded therein 0.1 to 10 percent by total weight of said linear polymer the moiety

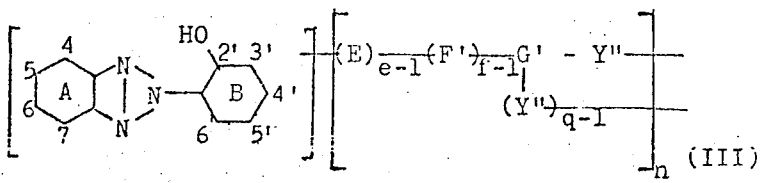

wherein
A is a monocyclic arylene radical,
B is a monocyclic arylene radical,
E is an alkylene radical of from 1 to 4 carbon atoms,
$e, f, n$ and $q$ are independently integers from one to two, with the limitations that (1) $f$ must be at least as large as $e$, and (2) the sum of $q + n$ is at most 3,
F' is a member selected from the group consisting of $-O-$, $-S-$, $-SO_2-$, $-SO_2NH-$, $-CONH-$ and $-N-$ carboxylic acidacyl,
G' is a hydrocarbon radical of from 1 to 7 carbon atoms the valency of which radical methematically equals $q$ plus one, with the limitation that, if G' is bound to at least two heteroatoms one of which pertains to F' as defined and the other to Y'', each of said heteroatoms is bound to a different carbon atom of G', and
Y'' is a member selected from the group consisting of carbonyl and imino, with the limitation that when Y'' is imino, Y'' must be bound to a saturated carbon atom contained in said G', being linked with the free bond at the $(E)_{e-1}$ end thereof to one of the positions 3', 4' or 5' of ring B or to position 5 of ring A.

2. A linear polycarbonamide as defined in claim 1, wherein said moiety is of the formula

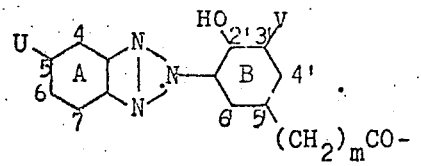

wherein
U is a member selected from the group consisting of hydrogen, $-CO-O$ and $-SO_2NHCH_2CO-$, the latter member being linked to said A nucleus through the $-SO_2-$ moiety,
V is a member selected from the group consisting of hydrogen and methyl, and
$m$ is an integer from one to three inclusive.

3. A linear polycarbonamide as defined in claim 1, wherein said moiety is of the formula

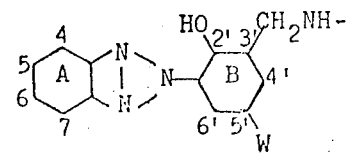

wherein
W is a member selected from the group consisting of methyl and cyclohexyl.

4. A linear polycarbonamide as defined in claim 2, wherein said moiety is of the formula

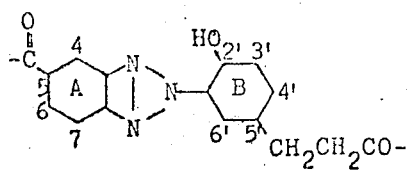

5. A linear polycarbonamide as defined in claim 2, wherein said moiety is of the formula

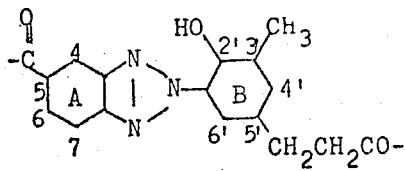

6. A linear polycarbonamide as defined in claim 1, wherein said moiety is of the formula

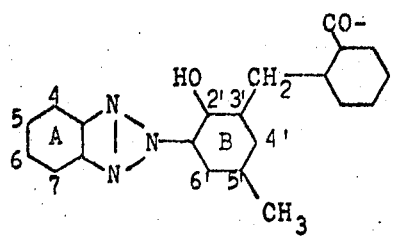

7. A linear polycarbonamide as defined in claim 1, wherein said moiety is of the formula

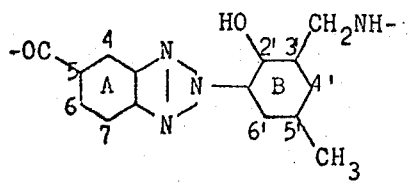

8. A synthetic linear film- and fiber- forming polycarbonamide of improved light stability having condensed therein as in integral part of the polycarbonamide chain from 0.1% to 10% by weight, based on the total weight of said polymer, a radical derived from an ultraviolet absorbing agent of the formula

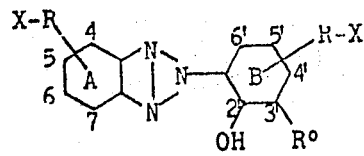

wherein
R is divalent hydrocarbon of from 1 to 7 carbon atoms,
X is selected from the group consisting of hydrogen, carboxy and amino, with the proviso that at least one X be amino or carboxy, and
R° is selected from the group consisting of hydrogen and lower alkyl.

9. A synthetic linear film- and fiber-forming polycarbonamide of improved light stability having condensed therein as an integral part of the polycarbonamide chain from 0.1% to 10% by weight, based upon the total weight of the polycarbonamide, a radical derived from an ultraviolet absorbing agent of the formula

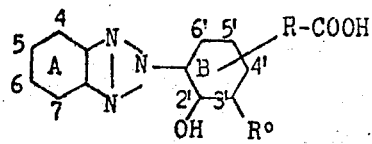

wherein
R is alkylene of from 1 to 7 carbon atoms, and
R° is a member selected from the group consisting of hydrogen and lower alkyl.

* * * * *